United States Patent [19]

Cikut et al.

[11] 4,329,234

[45] May 11, 1982

[54] MULTI-STAGE GAS LIQUID REACTOR

[75] Inventors: John J. Cikut, Chester; Irving D. Crane, Jr., Randolph; Theodore Princiotto, Jr., Mountain Lakes, all of N.J.

[73] Assignee: Exxon Research & Engineering Co., Florham Park, N.J.

[21] Appl. No.: 140,570

[22] Filed: Apr. 15, 1980

[51] Int. Cl.³ .............................................. C02F 1/74
[52] U.S. Cl. .................................... 210/752; 210/199; 210/256; 210/758; 261/123; 261/124
[58] Field of Search ............. 23/232 R; 422/193, 194; 261/123, 124, DIG. 75, 121 R; 210/63 R, 199, 256, 261, 752, 758

[56] References Cited

U.S. PATENT DOCUMENTS

| | | | |
|---|---|---|---|
| 1,061,573 | 5/1913 | Stevens | 261/121 |
| 1,774,210 | 8/1930 | Perks | 23/232 R |
| 1,870,193 | 8/1932 | Grahame | 23/232 R |
| 2,832,674 | 4/1958 | Ranzenberger | 422/193 |
| 2,834,471 | 5/1958 | Gibson | 210/256 |
| 2,901,114 | 8/1959 | Smith et al. | 210/256 |
| 2,963,430 | 12/1960 | Schreiber | 210/256 |
| 3,243,169 | 3/1966 | Caudle et al. | 422/193 |
| 3,349,030 | 10/1967 | Savage | 210/256 |
| 3,408,288 | 10/1968 | Messa | 210/256 |
| 3,431,085 | 3/1969 | Cimerol et al. | 422/193 |
| 3,759,669 | 9/1973 | Aaron et al. | 422/193 |
| 3,966,559 | 6/1976 | Athanassiades | 196/111 |

FOREIGN PATENT DOCUMENTS 694918  7/1953  United Kingdom ....... 261/DIG. 75

Primary Examiner—Gregory N. Clements
Attorney, Agent, or Firm—F. Donald Paris; Donald F. Wohlers

[57] ABSTRACT

A multi-stage gas/liquid reactor is disclosed which has several concentric internal baffles, which define reaction stage zones. A central liquid inlet and an array of gas inlets supply the reactants which flow sequentially through diametrically opposed baffle passages to the various reaction stage zones. A method of using such a reactor to provide radially outward, positive pressure against the baffles is also disclosed.

6 Claims, 3 Drawing Figures

MULTI-STAGE GAS LIQUID REACTOR

BACKGROUND OF THE INVENTION

1. Field of the Invention

This invention relates to apparatus for reacting a liquid reactant and a gaseous reactant. More particularly, it relates to a multiple stage reactor provided in a single reaction vessel. The invention incorporates several concentric baffles in a single reaction vessel to provide for multiple stage gas-liquid reactions.

The design of the apparatus of this invention is directed to controlling the pressures inherently developed in the large scale reaction of gas and liquid reactants on a continuous basis, such as in the treatment of liquid hydrocarbons with a gaseous oxidizer.

Multiple stage reactors are presently known. Such reactors (e.g., FIG. 3) are used for gas-liquid reactions, but the apparatus employed consists of a reactor fitted with flat baffles. Flat baffles are difficult to fabricate for applications where significant pressure forces will be experienced. Such baffles are inherently weaker, particularly at their joints, than more continuous baffle designs, such as cylindrical baffles. It is hard to design flat baffles of adequate strength into a system because of the difficulty in insuring that pressure forces will always act in a single direction. Finally, flat or planar baffling requires greater material mass than a comparable continuous curve baffle.

2. The Prior Art

The prior art shows several embodiments of multiple stage vessels and also embodiments of curved or cylindrical baffling, none of which are directed to the specific requirements of the field of the subject invention.

In U.S. Pat. No. 1,774,210 to Perks, a distillation and separation vessel is described which has several concentric baffles. Such baffles are not designed for significant liquid pressures and they do not have direct contact with the vessel floor as is necessary for a liquid reaction vessel of the subject invention's design.

A hydrocarbon separation vessel is shown in U.S. Pat. No. 1,870,193 to Grahame, in which cylindrical baffles are formed off the separatory vessel floor. The baffles are not concentrically positioned within the vessel.

In Ranzenberger, U.S. Pat. No. 2,832,674, concentric baffling is utilized in a continuous reaction, induced flow reaction tank. This apparatus is directed to a single phase reaction with a spiral flowpath.

U.S. Pat. No. 2,901,114 to Smith et al. discloses a sewage treatment facility with concentric baffles and radial baffles. The flowpath is dissimilar to that of the subject invention.

Additional cylindrical baffling is found in U.S. Pat. No. 1,061,573 to Stevens, U.S. Pat. No. 3,243,169 to Candle et al., U.S. Pat. No. 3,431,085 to Cimerol et al., U.S. Pat. No. 3,759,669 to Aaron et al. and U.S. Pat. No. 3,966,559 to Athanassiadis.

With a view of the shortcomings and deficiencies of the prior art, the present invention is directed to a multiple stage, gas-liquid reaction vessel of improved design, which has baffles of increased strength as more fully described below.

SUMMARY OF THE INVENTION

The present invention is directed to a gas-liquid reaction vessel which has several concentric, cylindrical baffles affixed to the interior of the vessel base. This provides multiple stage reaction zones for the reactants at decreasing liquid pressure as the reaction of the liquid reactant progresses.

It is an object of this invention to provide sequential multiple stage reaction in a single vessel.

It is an object of the present invention to reduce material requirements and stress failure of the baffles by the use of a cylindrical baffle design in a liquid pressure reaction.

Another object of the present invention is a reaction apparatus wherein positive outward pressure is exerted on the baffles at all times by the appropriate placement of the liquid reactant inlet, the control of solution height at the various reaction stage zones and by control over solution density in the various zones.

Still another object of the invention is to provide complete intermixing of the reactants by diametrically opposed placement of the baffle passages and by the orientation of the gas reactant inlets.

Yet another object of the invention is to protect against accidental negative, or inward pressure forces acting upon the baffling of the gas-liquid reaction vessel by appropriate placement of reinforcing truss supports.

The invention is also directed to a method of reacting gas and liquid reactants to control pressures exerted against the reaction apparatus, wherein the gas and liquid is reacted in sequential stages.

These and other objectives not fully set forther here are described in greater detail in the preferred embodiment set forth below.

BRIEF DESCRIPTION OF THE DRAWINGS

The invention will be more fully understood from reference to the accompanying drawings setting forth the preferred embodiment of the subject invention, in which.

DETAILED DESCRIPTION OF A PREFERRED EMBODIMENT OF THE INVENTION

Figure 1:
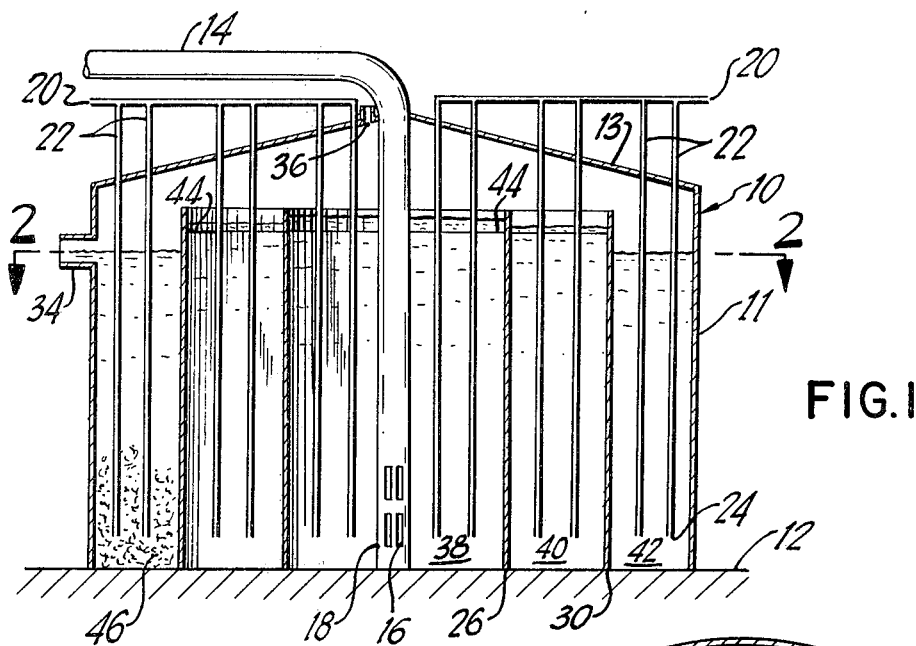
FIG. 1 is a vertical cross-section view of the apparatus of the subject invention taken through the center of the apparatus.

The apparatus, as shown in FIG. 1, consists of a reaction vessel shell 10 including a cylindrical sidewall 11 resting on a base 12 covered by a conically peaked roof 13.

A set of cylindrical, concentric baffles consisting of an inner baffle 26 and an outer baffle 30 are affixed to the base 12. These baffles are positioned concentrically within the cylindrical vessel, as well as concentrically with respect to each other. The baffles do not close off the entire space within the reaction vessel. The baffles terminate at their upper edge below the height of the reactor roof 13, but above the predetermined maximum height of the liquid level of the reactants in the reaction vessel 10.

A liquid product discharge outlet 34 passes through the vessel sidewall 11 near the top of the sidewall, and the placement of this outlet determines the maximum liquid level height in conjunction with the rate of liquid reactant supply.

A liquid inlet conduit 14 runs horizontally overhead of the reaction vessel 10 to the axial center of the cylindrical vessel. At that point, the inlet conduit 14 has a right angle elbow which turns the inlet conduit downward through the vessel roof 13 at the roof's apex. This vertical section 18 of the inlet conduit descends down through the reaction vessel interior, and the conduit end rests against the base 12. The conduit 14 is closed at its absolute end. Liquid injection ports 16 located in the side of the conduit proximate to its end supply the liquid reactant, which moves through the inlet conduit to the reaction vessel interior. The liquid reactant is supplied to the lower region of the interior space of the vessel.

A series of multiple stage reaction zones 38, 40 and 42 are defined by the vertical section 18 of the inlet conduit 14, the inner baffle 26, the outer baffle 30 and the reaction vessel sidewall 11.

The innermost zone is the first stage reaction zone 38 where initial reaction is maintained between the gas and liquid reactants. It is defined by the vertical section 18 of the liquid inlet and the inner baffle 26.

The intermediate zone is the second stage reaction zone 40 where additional reaction between gas and liquid reactants is conducted. This zone 40 is defined by the inner baffle 26 and the outer baffle 30.

The outer or last zone is the third stage reaction zone 42 where final reaction of the gas and liquid reactants is undertaken to produce the liquid product discharged through outlet 34. The third stage zone 42 is defined by the outer baffle 30 and the reaction sidewall 11.

Liquid flow is conducted from the liquid inlet conduit 14 and down the vertical section 18 of the inlet to the injection ports 16, where the liquid reactant flows into the reaction vessel 10 at the first stage reaction zone 38.

Figure 2:
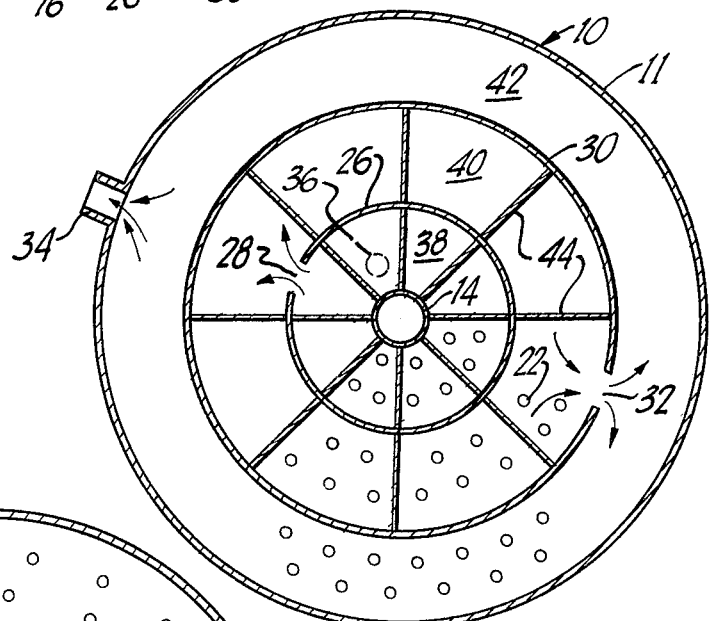
FIG. 2 is a horizontal cross-section view of the apparatus of the subject invention taken along the line 2—2 of FIG. 1.

As viewed in FIG. 2, the liquid reactant solution flows out of the first stage reaction zone 38 through inner baffle 26. An inner baffle passage 28 is situated in the inner baffle to provide for such radially outward flow of the solution.

The inner bafflw passage 28 consists of a vertical break or opening in the inner baffle's cylindrical structure 26.

Liquid showing flowing from this passage 28 then enters the second stage reaction zone 40. The liquid solution flows around each side of the exterior of the inner baffle 26. This flow is considered as both clockwise and counterclockwise flow as viewed from above, as in FIG. 2.

The liquid solution then flows out of the second stage reaction zone 40 through outer baffle 30. An outer baffle passage 32 is provided in the outer baffle 30. The passage 32 consists of a vertical break or opening in the cylindrical structure of the outer baffle 30. The outer baffle passage 32 is larger in total cross-section than the inner baffle passage 28 and is diametrically opposite the passage 28. Both passages 28 and 32 are aligned with outlet passage 34 to provide a symmetrical arrangement.

The liquid solution flows out of outer baffle passage 32 into the third stage reaction zone 42. Again, the liquid solution in the third stage then flows around the outside of the outer baffle in both a clockwise and counterclockwise direction as viewed from overhead, in FIG. 2, similar to the flow in the other zones.

The liquid product in the third stage reaction zone 42 then exits the reaction vessel through the liquid discharge outlet 34, which is remotely located with respect to the passage 32 at the opposite side of the third stage reaction zone 42.

The three reaction zones 38, 40 and 42 within the reaction vessel are supplied with both gas and liquid reactants. A number of gas reactant inlet headers 20 are arranged above the roof 13 of the reaction vessel. A plurality of vertically oriented gas inlet pipes 22 depend from each of the headers 20. These inlet pipes 22 terminate with a gas orifice 24 inside the reactor vessel and adjacent the vessel base 12. The inlet pipes 22 terminate with sufficient clearance above said base 12 to allow discharge of gas reactant and to avoid potential clogging from sediment buildup on the base of the reaction vessel. Each inlet header 20 provides a number of inlet pipes to each of the reaction zones 38, 40 and 42 between the liquid inlet 14, the inner and outer baffles 26 and 30 and the vessel sidewall 11. A greater number of gas inlets supply the third stage reaction zone 42 than the second stage reaction zone 40, and a greater number of gas inlets supply the second stage reaction zone 40 than the first stage zone 38. The inlets are distributed in a concentric pattern.

Gas reactants are bubbled through the liquid reactant in each reaction zone in order to induce reaction of the reactants in each zone. A liquid product and an expended gas reactant and unused gas reactant result from these reactions. More gas reactant than liquid reactant is supplied to the reaction vessel to accomplish the complete reaction of liquid reactant. The unused and expended gas reactants rise to the surface of the liquid solution and converge from the various reaction zones above the baffles, but below the conically peaked roof 13. A gas vent stack 36 is located in the peak of the vessel roof 13 adjacent the liquid inlet 14. The gas vent stack 36 exhausts the collected gases from the reaction vessel. These gases can be either vented to the atmosphere, or recycled through the gas inlet headers 20 by means of appropriate apparatus, which does not form the subject of this invention, and which is not described herein.

The reaction vessel apparatus, as described above, is designed to operate with positive (radially outward) liquid pressure. However, radially oriented truss supports 44 are fastened to the inlet conduit 14 and are attached to each of the baffles 26 and 30 to provide the necessary structural strength in the event of accidental negative (inward) pressure. These truss supports do not block the free flow of liquid around the baffles in the various reaction zones and are generally of small diameter, tubular structures.

In operating the reaction vessel apparatus, liquid reactants, such as liquid hydrocarbons, are supplied through the inlet 14 by way of inlet ports 16 to the reaction vessels' first stage reaction zone 38. Gas reactant is simultaneously supplied to the reaction vessel's various reaction zones 38, 40 and 42 by gas inlets 20 and 22.

As the liquid solution of liquid reactant, gas reactant, and liquid product, flows sequentially from one zone to the next zone through the baffle passages, sufficient liquid supply is maintained to insure a greater liquid solution level in the first zone than the second zone and a similar proportional level in the second zone with respect to the third zone. This liquid solution level variation is achieved by the flow characteristics resulting from the increase in the relative baffle passage sizes and the relative greater area of each reaction zone as the liquid flows radially outward in its circuitous path from the first zone to the third zone. The fact that the liquid solution level is higher in the first reaction zone than in the second reaction zone and higher in the second reaction zone than in the third reaction zone, provides for an overall positive (radially outward) pressure being applied to the baffles and the veseel sidewall. This pressure is easily accepted by the cylindrical design of these vessel components.

The gas reactant is supplied to the lower area of each reaction zone by discharging the gas reactant from inlet pipes 22 through the gas orifices 24. The gas reactant is bubbled upwardly through the liquid solution. The gas reactant reacts with the unreacted liquid reactant in the solution. The reaction vessel apparatus has a greater number of gas inlets in the third stage reaction zone than in the second stage reaction zone, and a greater number in the second stage reaction zone than in the first stage reaction zone. Therefore, for a given supply pressure of gas reactant to the various gas inlet headers 20, more gas reactant will be provided to the outer reaction zones. This fact determines that overall solution densities will decrease as the solution flows radially outward on its circuitous flowpath. This variation in solution density also creates a net positive pressure on the baffles.

Finally, because of the diametrically opposed baffle passages and the indirect liquid discharge outlet, the baffles do not experience any liquid flow forces directed perpendicularly toward the baffles.

These factors decrease the required strength of the baffle structures, while at the same time the cylindrical structure of the baffles provides an inherently stronger baffle structure than found in flat or planar baffles.

The liquid solution contacts fresh gas reactant as it passes through each reaction zone sequentially, until it gets to the third stage reaction zone adjacent the liquid discharge outlet. At this point, the liquid solution consists of, predominantly, liquid product. The expended gas reactant and unreacted gas reactants, which surface to the top of the liquid solution, are collected at the top of the vessel roof and are exhausted through the gas vent stack 36. The gas is vented to the atmosphere, or alternately, it is recycled to the reaction vessel. More gas reactant is supplied to the reaction vessel than can be fully reacted with the liquid reactant in order that all liquid reactant becomes liquid product.

Figure 3:
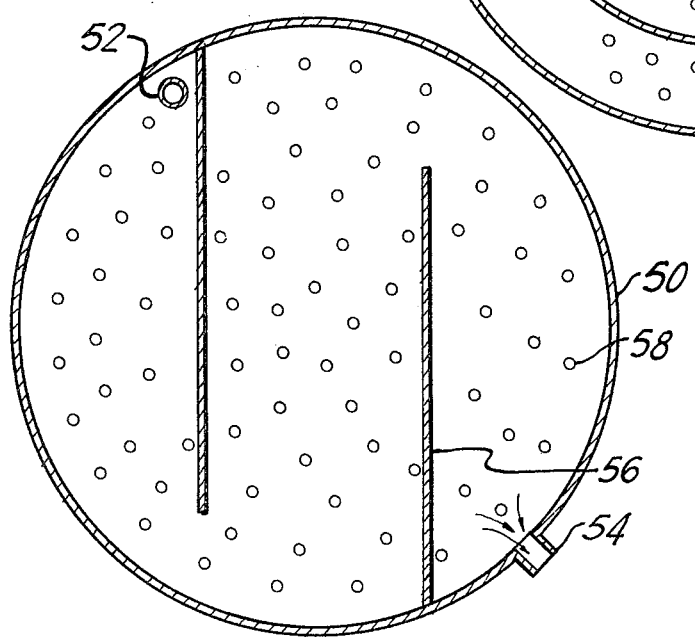
FIG. 3 is a horizontal cross-section view of a prior art reactor.

FIG. 3 is a prior art reactor comprising vessel wall 50, a liquid inlet 52 and discharge outlet 54. A pair of spaced flat baffles 56 are vertically arranged in parallel relationship in the vessel. Air inlets are shown at 58. This design has inherent difficulty to adopt to pressure forces generated in the reactor.

A preferred embodiment of the invention is described above but the skilled artisan will recognize various modifications and changes which do not depart from the scope of this invention. These changes are deemed to be within the scope of the invention as defined in the claims which follow, and such claims should be liberally interpreted in a manner commensurate with the broad scope of the invention.

What is claimed is:

1. The method of sequentially reacting a liquid reactant and a gaseous reactant in a concentrically baffled, multi-stage reactor with a central liquid inlet and an array of gas inlets, comprising the steps of:
   (a) supplying liquid reactant through the liquid inlet to the center of said reactor so as to create a positive liquid pressure exerted radially outward against said baffles,
   (b) supplying gaseous reactants through the gas inlets to the lower regions of the various stages of the reactor so as to intermix and react with the liquid reactant and in such proportion as to decrease the density of the reaction mixture in each successive stage from the density of the reaction mixture in the preceding stage from the center of the reactor to its outer wall,
   (c) passing the liquid reactant through a circuitous flow path by means of diametrically opposed baffle passages, each passage being of increasingly larger cross-sectional area than the area of the passage from the preceding stage,
   (d) removing the reacted liquid product through an overflow discharge outlet, and
   (e) exhausting the gaseous reactant collected at the top of the reactor.

2. The method of claim 1 including the further step of venting the exhausted gaseous reactants to the atmosphere.

3. Apparatus for conducting a multistage reaction between a liquid reactant and a gas reactant in which the reaction takes place in a single reactor vessel under significant positive liquid pressure, comprising:
   (a) a closed, cylindrical reactor vessel, on a base having a roof and a sidewall,
   (b) liquid discharge outlet in said reactor vessel sidewall,
   (c) a gas vent stack in said reactor vessel roof,
   (d) a liquid reactant inlet conduit entering the vessel at the central, axial portion of the vessel and having liquid injection ports near the base of the reactor vessel,
   (e) a series of concentric cylindrical baffles secured to the base and terminating below the reactor vessel roof for defining at least two staged reaction zones,
   (f) a gas reactant inlet means comprising a plurality of inlet headers and including a plurality of gas inlet pipes entering the vessel and terminating with gas reactant discharge orifices near the base inside the reactor vessel, such that several inlet pipes are positioned between each of the baffles and the vessel wall to discharge an increasingly greater amount of gas reactant in each outwardly successive concentric stages reaction zone to thereby lower the density of the gas-liquid mixture therein relative to the gas-liquid mixture density in the adjacent preceding reaction zone and,
   (g) a baffle passage in each baffle arranged diametrically opposite the baffle passage in the adjacent baffle so as to allow sequential radially outward liquid flow between said staged reaction zones, each said bafflw passage comprising a vertical slit extending the height of said baffle and having a larger cross-sectional area than the preceding baffle passage whereby flow of said liquid reactant will occur between the innermost reaction zone through successive outer reaction zones to said outlet and whereby due to said differing fluid densities in said zones a radially outward force will be exerted on each of said baffles.

4. The invention of claim 3 wherein said baffles are supported by truss supports which radiate outwardly from the liquid inlet conduit to the baffles.

5. The invention of claim 3 wherein the liquid inlet conduit consists of a horizontal feed conduit positioned above the reactor vessel and a vertical inlet conduit coaxial with the reactor vessel and baffles, which conduit passes through the vessel roof and terminates at the reactor base.

6. The invention of claim 3 wherein the reactor vessel has two concentric baffles defining three reaction stage zones.

* * * * *